US007380534B2

(12) United States Patent
Sekimoto

(10) Patent No.: US 7,380,534 B2
(45) Date of Patent: Jun. 3, 2008

(54) INTAKE DEVICE OF V-TYPE ENGINE OF MOTORCYCLE

(75) Inventor: Osamu Sekimoto, Hamakita (JP)

(73) Assignee: Suzuki Kabushiki Kaisha, Hamamatsu-shi (JP)

( * ) Notice: Subject to any disclaimer, the term of this patent is extended or adjusted under 35 U.S.C. 154(b) by 161 days.

(21) Appl. No.: 11/385,660

(22) Filed: Mar. 22, 2006

(65) Prior Publication Data

US 2006/0213475 A1   Sep. 28, 2006

(30) Foreign Application Priority Data

Mar. 23, 2005   (JP)   ............... 2005-084300

(51) Int. Cl.
*F02M 35/10* (2006.01)
*F02B 77/04* (2006.01)
(52) U.S. Cl. ............... 123/198 E; 123/184.35
(58) Field of Classification Search .......... 123/184.31, 123/184.35, 198 E, 54.4; 55/385.3; 180/229
See application file for complete search history.

(56) References Cited

U.S. PATENT DOCUMENTS 5,560,446 A * 10/1996 Onishi ................. 180/219

6,910,546 B2 * 6/2005 Tsutsumi et al. .......... 180/219

FOREIGN PATENT DOCUMENTS

JP   08-108877   4/1996

* cited by examiner

*Primary Examiner*—Stephen K. Cronin
*Assistant Examiner*—Hyder Ali
(74) *Attorney, Agent, or Firm*—Oblon, Spivak, McClelland, Maier & Neustadt, P.C.

(57) ABSTRACT

An intake device of a V-type engine provided with two cylinders inclining in a longitudinal direction of a motorcycle includes a center air cleaner arranged above a V-bank space formed between the two cylinders, a pair of right and left side air cleaners arranged on both sides of the V-bank space, and an air/fuel mixture supply device disposed between the center air cleaner and the V-bank space. An internal space of the center air cleaner is communicated with an intake port of each of the cylinders through the air/fuel mixture supply device. The internal space of the side air cleaner is divided into a dirty side and a clean side with an air filter being interposed therebetween, in which the clean side is connected to the center air cleaner and the dirty side is provided with an intake port communicating with an outside. The intake port is opened so as to face the V-bank space side.

8 Claims, 8 Drawing Sheets

INTAKE DEVICE OF V-TYPE ENGINE OF MOTORCYCLE

CROSS REFERENCE TO RELATED APPLICATION

This application is based upon and claims the benefit of priority from prior Japanese Patent Application No 2005-084300 filed on Mar. 23, 2005, the entire contents of which are incorporated herein by reference.

BACKGROUND OF THE INVENTION

1. Field of the Invention

The present invention relates to an intake device of a V-type engine of a motorcycle.

2. Related Art

A motorcycle is equipped with a V-type engine having two cylinders including one inclined to the front side and the other inclined to the rear side in the vehicle longitudinal direction.

There is known an arrangement of air/fuel mixture supply device such as a carburetor or a throttle body constituting an intake device and an air cleaner for purifying the intake air as disclosed in the Japanese Patent Laid-Open Publication No. HEI 8-108877. That is, a recess is formed on a lower surface of a fuel tank located above the engine with a center air cleaner being arranged therein, and side air cleaners are arranged on right and left side surfaces of the engine, respectively. Further, an internal space of these side air cleaners is divided into a dirty side and a clean side with an air filter being interposed therebetween. An intake pipe extending right and left from the center air cleaner is connected to the dirty side of the side air cleaner, while the clean side being connected to the mixture supply device.

An external air to be sucked into the engine first enters the center air cleaner and then, after being divided into right and left, it flows into the dirty side of the side air cleaner. After being purified by the air cleaner, the external air flows to the mixture supply device through the clean side and is taken into the engine.

In this way, if three air cleaners in total are provided at the center and side portions, and the air sucked from the center air cleaner is supplied to the mixture supply device after being divided into the right and left side air cleaners, intake passages of the front and rear cylinders can be made substantially independent so that intake interference is difficult to occur, and an intake efficiency can be improved to some extent. In addition, attaching/detaching working for washing or replacement of the air filter inside the side air cleaner is favorably done.

However, since the air filter is located immediately before the mixture supply device in the arrangement mentioned above, the capacity of the clean side cannot be increased and the intake efficiency cannot be largely improved by using an intake inertia effect, for example. If the capacity of the side air cleaner is increased, the intake efficiency can be improved more or less. However, this arrangement makes the side air cleaner extend outward in the vehicle-width direction, thereby degrading compactness. Moreover, the side air cleaners will interfere with the knees of a rider, impairing riding stability.

SUMMARY OF THE INVENTION

The present invention was conceived in consideration of the above circumstances, and an object of the present invention is to provide an intake device for a V-type engine of a motorcycle capable of improving intake efficiency with compact structure as well as improving riding stability of a rider and promoting quietness and prevention of fouling of the intake device.

This and other objects of the present invention can be achieved according to the present invention by providing an intake device of a V-type engine provided with two cylinders inclining in a longitudinal direction of a motorcycle, comprising:

a center air cleaner arranged above a V-bank space formed between the two cylinders of the V-type engine;

a pair of right and left side air cleaners arranged on both sides of the V-bank space; and an air/fuel mixture supply device disposed between the center air cleaner and the V-bank space, wherein an internal space of the center air cleaner is communicated with an intake port of each of the cylinders through the air/fuel mixture supply device, the internal space of the side air cleaner is divided into a dirty side and a clean side with an air filter being interposed therebetween, in which the clean side is connected to the center air cleaner and the dirty side is provided with an intake port communicating with an outside, and the intake port is opened so as to face the V-bank space side.

In a preferred embodiment of the above aspect, it may be desired that a pair of right and left side air cleaners have equal capacity and symmetrical shape, and a surface of each of the side air cleaners facing outside of a vehicle body has a shape protruded toward the outside of the vehicle body.

A surface of a pair of right and left side air cleaners facing inside of the vehicle body may have a shape conforming with the shape of the cylinder side surface caused by an arrangement offset in the vehicle-width direction of the cylinders of the V-type engine and each of the side air cleaners is brought close to the side surface of the cylinder so that at least a part of the side air cleaner is located inward, in the vehicle-width direction, from the side surface of the cylinder arranged in a manner offset outward in the vehicle-width direction as viewed from the side air cleaners, the center air cleaner is arranged in a vicinity of upper portions of the cylinders.

It may be desired that the clean sides of the right and left side air cleaners and the center air cleaner are connected to each other by way of intake ducts, which is connected to the upper portion inside of each of the side air cleaners and the side surface of the center air cleaner, and the right and left intake ducts are connected to the side surface of the center air cleaner in a manner offset in the longitudinal direction of the vehicle body.

It may be also desired that a lateral-grooved recessed portion having an inverted V-shape in a side view of the vehicle body is formed on a lower surface of the center air cleaner, the air/fuel mixture supply device for supplying the mixture to the rear-side cylinder is connected to a front-side surface of two front and rear surfaces constituting the recessed portion, and the air/fuel mixture supply device for supplying the mixture to the rear-side cylinder is connected to the rear-side surface constituting the recessed portion.

An upstream side of the air/fuel mixture supply device is directly connected to the two front and rear surfaces constituting the recessed portion on the lower surface of the center air cleaner, and a downstream side of the air/fuel mixture supply device is connected to the intake port of each of the cylinders through an inlet pipe. The air/fuel mixture supply device may be formed as a fuel-injection throttle body provided with an intake passage in which a butterfly-type main throttle valve manually manipulated is provided, a sub throttle valve manipulated by an actuator is provided on an upstream side of the main throttle valve, a fuel injector is provided on a downstream side of the main throttle valve, intake passages of the two throttle bodies are crossed with each other in a side view of the vehicle body so that the intake passage of the throttle body connected to the front-side cylinder is raised rearward, and the intake passage of the throttle body connected to the rear-side cylinder is raised forward, main throttle valve shafts of both the throttle bodies are directly connected to each other along the vehicle-width direction, and the throttle bodies are arranged so that the fuel injector is disposed in the recessed portion formed on the lower surface of the center air cleaner.

The V-type engine may be mounted on a front half part of a cradle-type vehicle-body frame, a fuel tank is mounted on the vehicle-body frame so as to be located above the V-type engine, a seat is arranged on the rear side of the fuel tank, a pair of right and left steps are provided on a lower front portion of the V-type engine, and the side air cleaners are arranged at positions at which a rider sitting on the seat and putting feet on the steps grips the side cleaners with knees of the rider.

According to the present invention of the structures mentioned above, the capacity of each of the center air cleaner and the side air cleaners can be reduced, while the total capacity, particularly the capacity of the clean sides, can be increased so as to be able to utilize the intake inertia effect, and the intake efficiency can be greatly improved in combination with the substantially straight arrangement of the intake passages. Moreover, since the intake port of the side air cleaner is opened facing the V-bank space side of the engine, foreign substances such as dust and moisture can be prevented from being sucked.

Furthermore, a rider can grip the side air cleaners with his knees while preventing the side air cleaners from largely extending outward in the vehicle-body direction, thus improving the riding stability.

Moreover, since the V-bank space is separated from the outside by the three air cleaners at the center and the side portions, a mechanical noise or intake noise generated from the vicinity of the V-bank can be shielded by the air cleaners, improving the quietness.

In addition, by surrounding the air/fuel mixture supply device with the center air cleaner, the fuel tank and the like, the air/fuel mixture supply device can be prevented from fouling.

The nature and further characteristic features of the present invention will be made more clear from the following descriptions made with reference to the accompanying drawings.

DESCRIPTION OF THE PREFERRED EMBODIMENTS

A preferred embodiment of the present invention will be described hereunder based on the attached drawings. Further, it is first to be noted that terms "upper", "lower", "right", "left" and like terms are used herein with reference to the illustration of the drawings or in a general standing state of the motorcycle.

Figure 1:
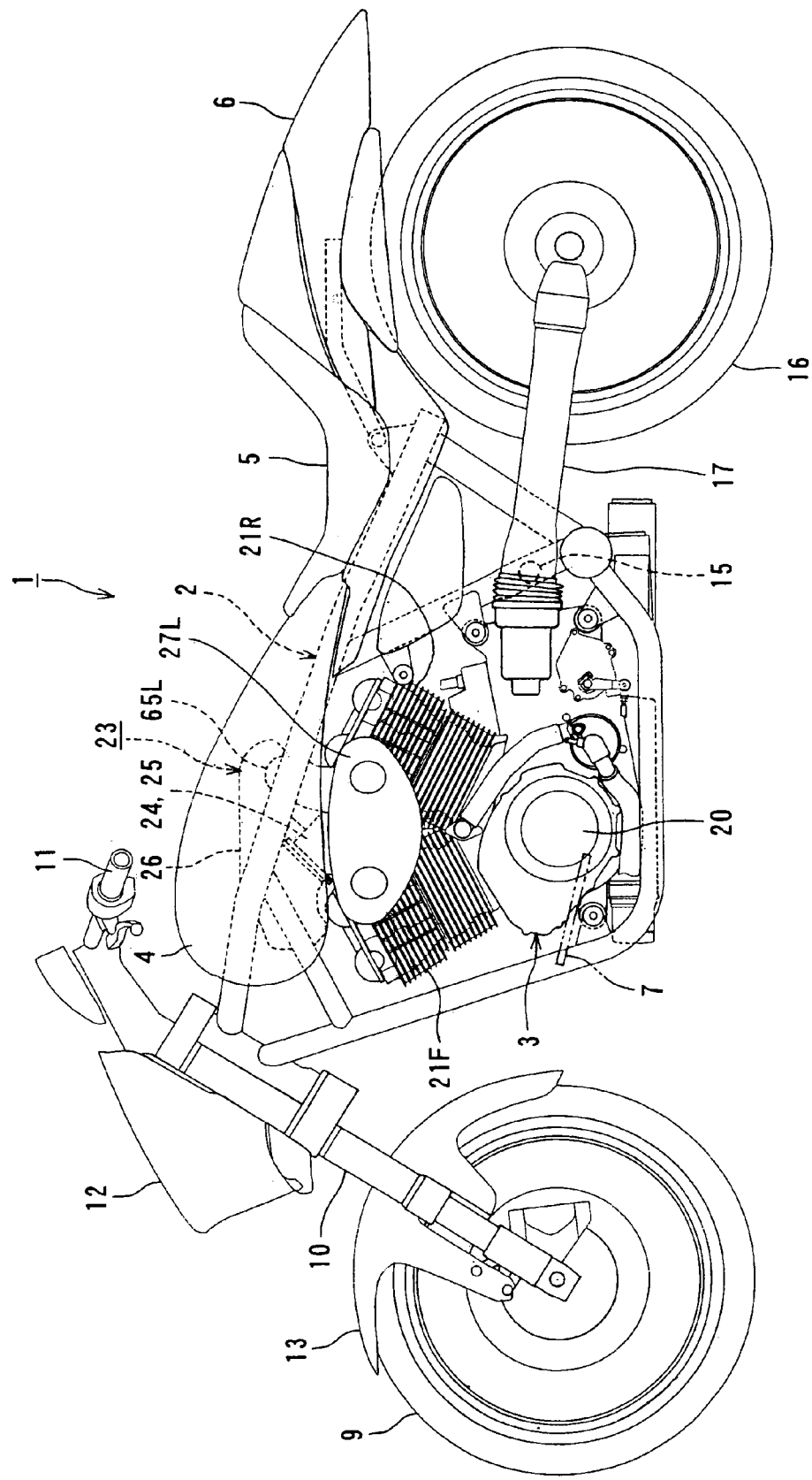
FIG. 1 is a left side view of a motorcycle to which an intake device according to the present invention is mounted.

With reference to FIG. 1, a motorcycle 1 is provided with a vehicle-body frame 2 formed mainly of a steel pipe into a cradle type, a two-cylinder V-type engine 3 is mounted on the front half part (cradle part) of this vehicle-body frame 2, and a fuel tank 4 is mounted on the vehicle-body frame 2 so as to be located above the V-type engine 3. A seat 5 and a rear cowling 6 are sequentially arranged on the rear side of the fuel tank 4, and a pair of right and left steps 7 are provided in the vicinity of the front lower portion of the V-type engine.

At a front head portion of the vehicle-body frame 2, a front fork 10 is supported to be pivotal right and left together with a handlebar 11, a front cowling 12, a front fender 13 and the like, while a swing arm 17 supporting a rear wheel 16 is supported to be vertically pivotal around a pivot shaft 15 bridged in the vehicle-width direction at a lower center portion of the vehicle-body frame 2.

Figure 2:
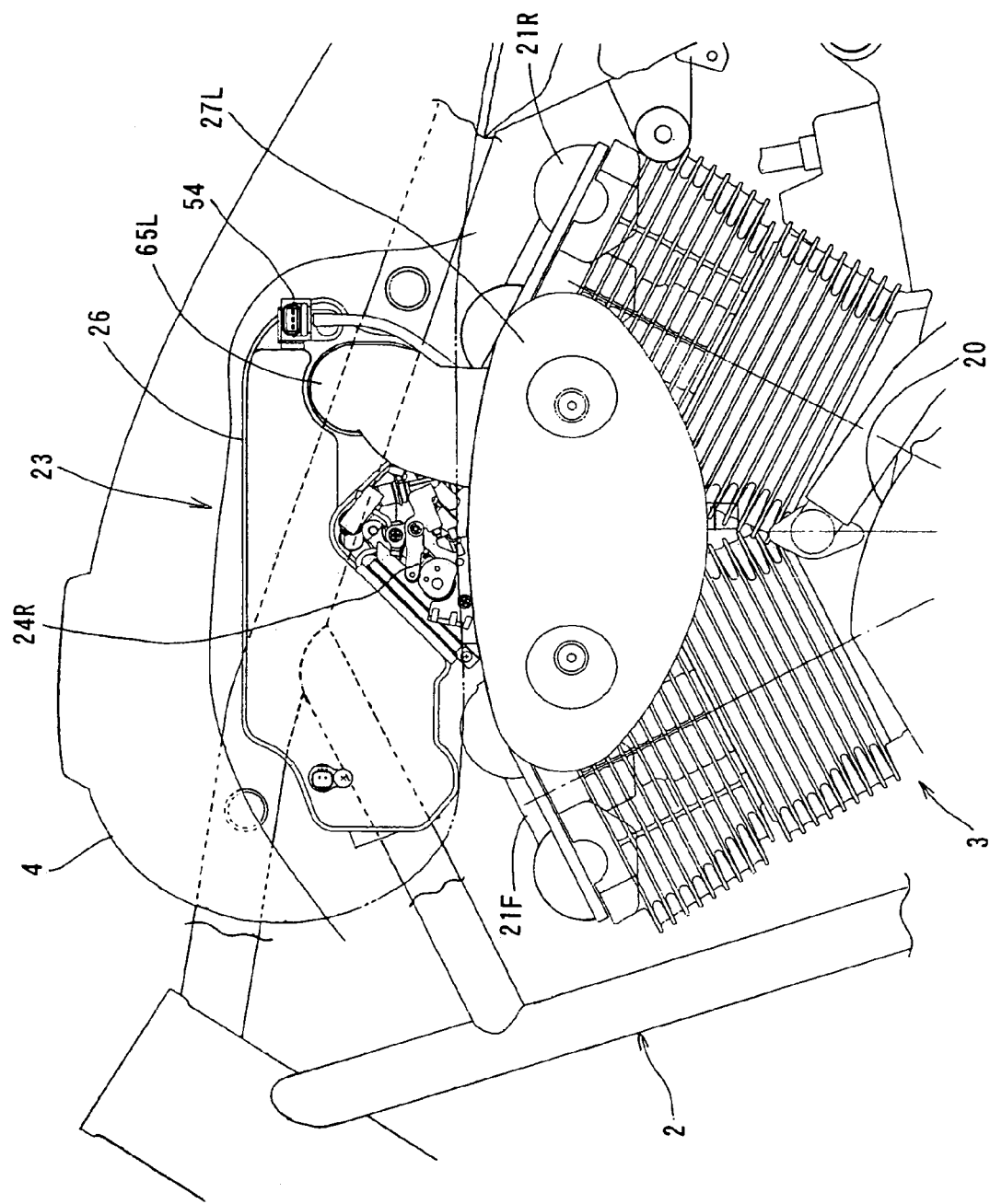
FIG. 2 is a left side view, in an enlarged scale, around a V-type engine and the intake device.
Figure 3:
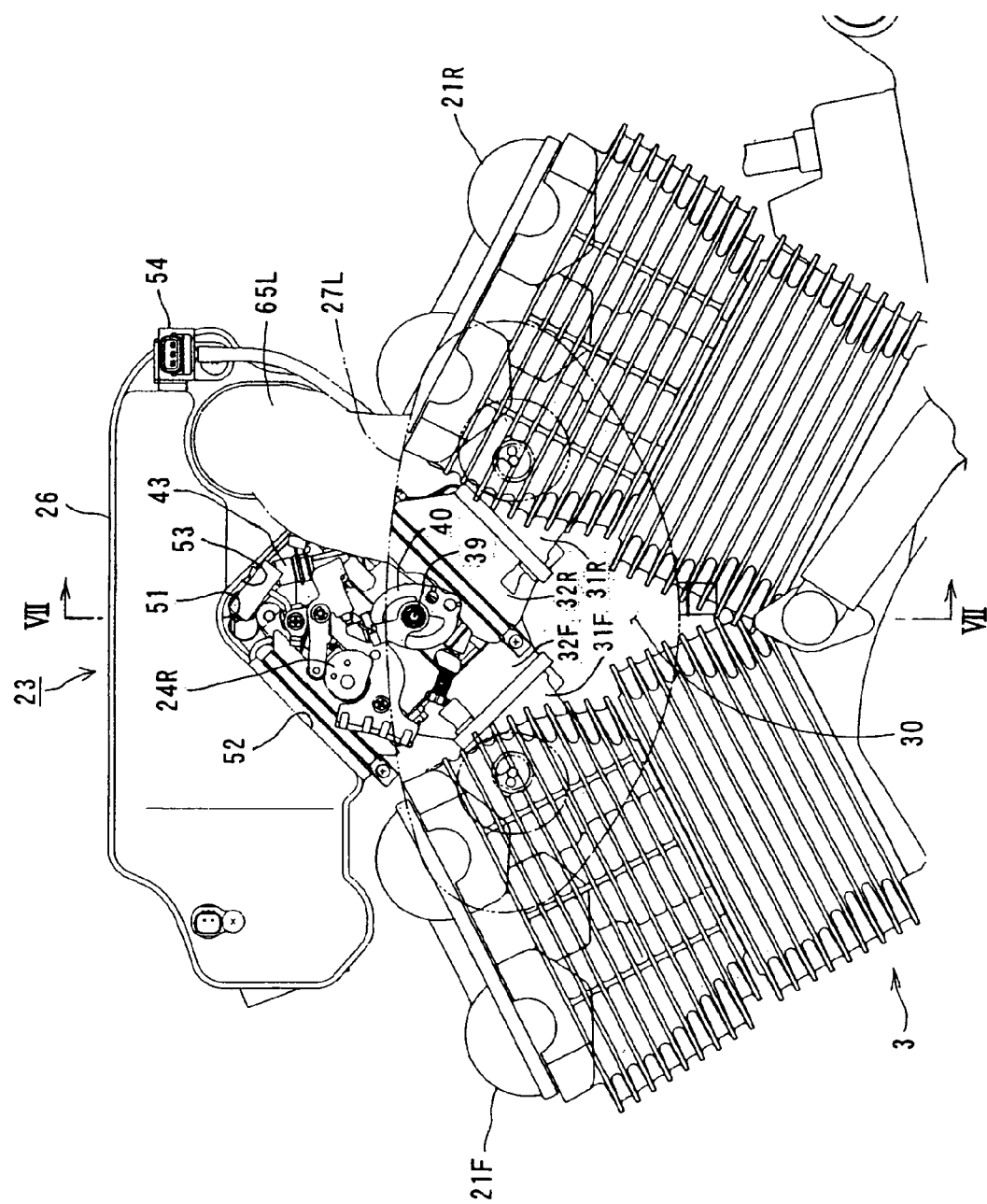
FIG. 3 is a left side view, in an enlarged scale, around the V-type engine and the intake device representing a preferred embodiment of the present invention.
Figure 4:
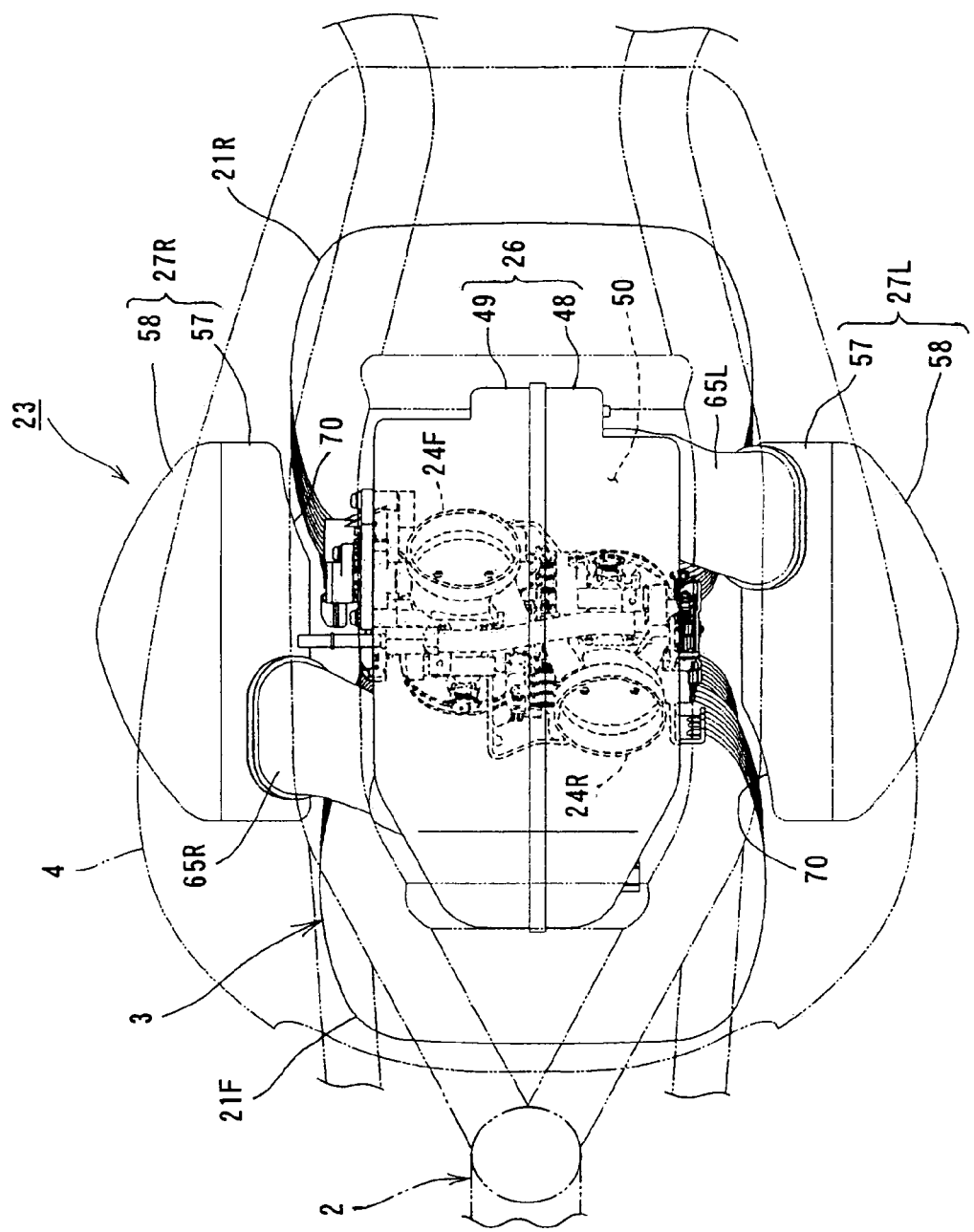
FIG. 4 is a plan view around the V-type engine and the intake device.

As shown in FIGS. 2 to 4, the V-type engine 3 is provided with two front and rear cylinders 21F and 21R inclined in the vehicle longitudinal direction at an upper portion of a crank case 20 of the engine. Both the cylinders 21F and 21R are arranged with a narrow angle of approximately 55°, for example, and an intake device 23 according to the present invention is constructed in the vicinity of upper portions of the cylinders 21F and 21R. An output of the V-type engine 3 is transmitted to the rear wheel 16 through a drive shaft which is inserted into the swing arm 17, for example.

The intake device 23 is constituted by two units of throttle bodies 24F and 24R constituting an air/fuel mixture supply device, one unit of a center air cleaner 26, and a pair of right and left side air cleaners 27L and 27R. The center air cleaner 26 is arranged above a V-bank space 30 formed between the front and rear cylinders 21F and 21R, while the side air cleaners 27L and 27R are arranged on both right and left sides of the V-bank space 30 as shown in FIG. 3.

Referring to FIG. 4, the front-side cylinder 21F is arranged with offset to the left side in the vehicle-width direction, while the right-side cylinder 21R is arranged with offset to the right side in the vehicle-width direction. Further, as shown in FIG. 3, intake ports 31F and 31R of each of the cylinders 21F and 21R are opened on the V-bank space side. A downstream side of the throttle body 24F is connected to the intake port 31F of the cylinder 21F through an inlet pipe 32F, while a downstream side of the throttle body 24R is connected to the intake port 31R of the cylinder 21R through an inlet pipe 32R. In this way, the throttle bodies 24F and 24R are arranged in the vertical direction between the center air cleaner 26 and the V-bank space 30.

Figure 5:
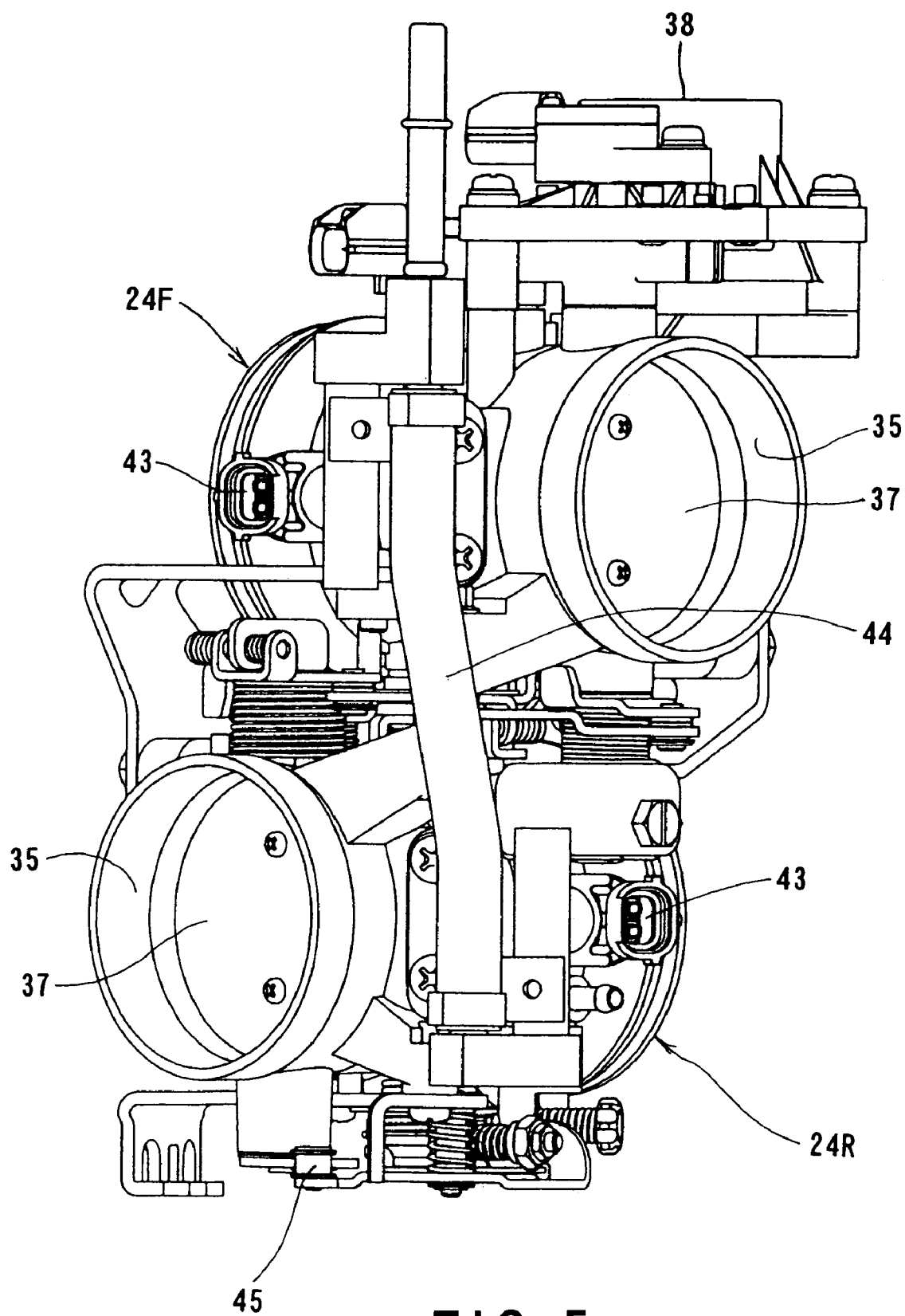
FIG. 5 is a plan view of a throttle body of the motorcycle of FIG. 1.
Figure 6:
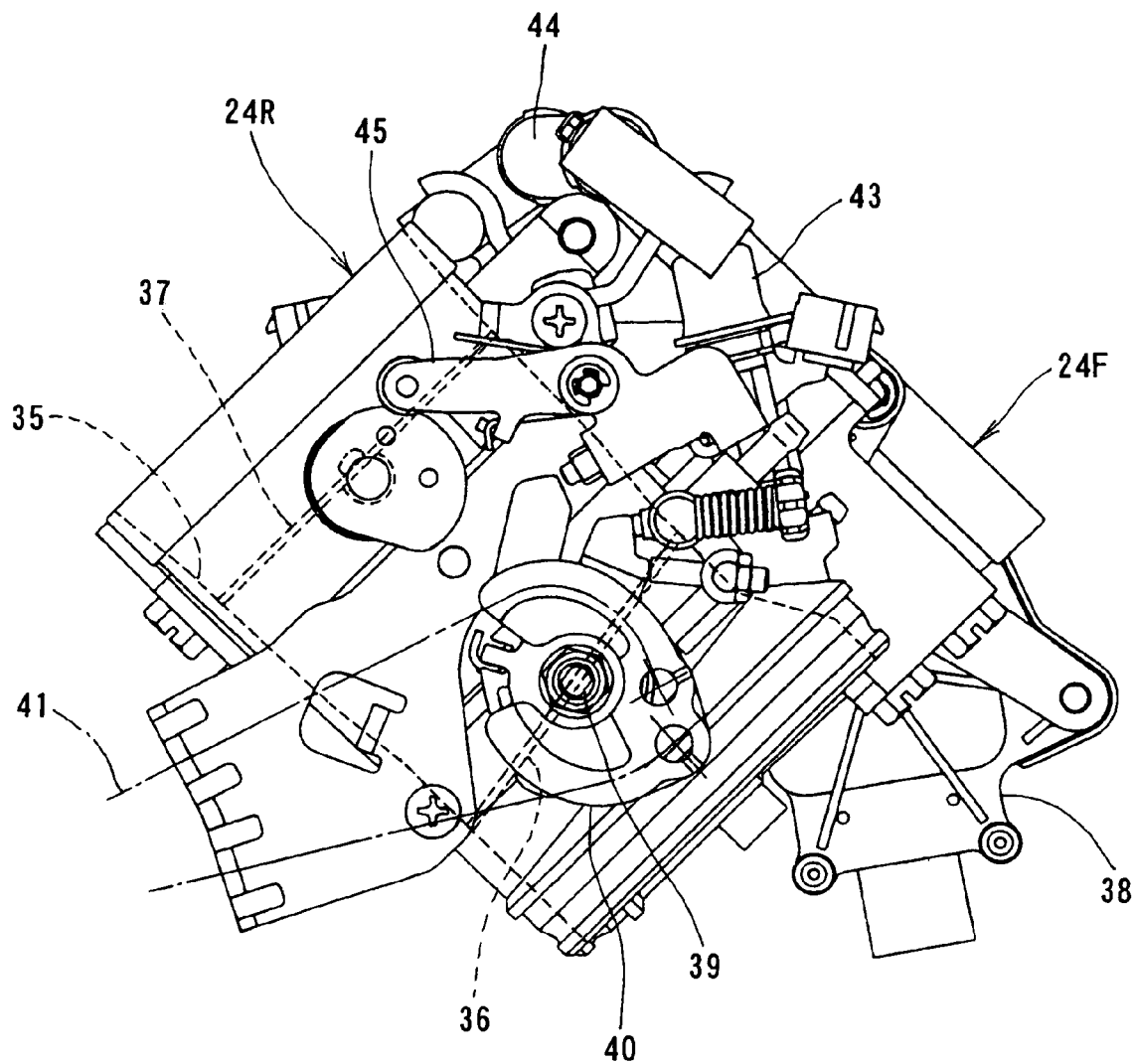
FIG. 6 is a left side view of the throttle body.

With reference to FIGS. 5 and 6, the throttle bodies 24F and 24R constitute a main body of a fuel-injection device, and a butterfly-type main throttle valve 36 is provided on the downstream side of an intake passage 35 formed therein, and a butterfly-type sub throttle valve 37 is provided similarly on the upstream side. The main throttle valve 36 is manually manipulated to be opened or closed through a throttle operation by a rider, and a sub throttle valve 37 is mechanically (or electrically) manipulated by an actuator, stepping motor, for example, 38 so as to be opened or closed.

The throttle body 24F of the cylinder 21F is located on the right side in the vehicle-width direction and an intake passage thereof is directed rearward from the intake port 31F, while the throttle body 24R of the cylinder 21R is located on the left side in the vehicle-width direction and an intake passage thereof is directed forward from the intake port 31R. The intake passages 35 of the throttle bodies 24F and 24R are connected and fixed to each other so as to be crossed with each other by a relative angle of 90°, for example, in a vehicle side view.

A valve shaft 39 of the main throttle valve 36 of the throttle bodies 24F and 24R is directly connected in a single straight line along the vehicle-width direction, and a throttle pulley 40 or a throttle lever is provided at the left end thereof to be integrally rotatable. The throttle pulley 40 is operated to be pivotally moved through the throttle operation by a rider via a throttle wire 41. The valve shaft 39 is integrally rotated and the two main throttle valves 36 are opened/closed at the same time.

On the downstream sides of the main throttle valves 36, fuel injectors 43 are provided, respectively, and a fuel is supplied to these fuel injectors 43 from a delivery pipe 44 extending in the vehicle-width direction so that the fuel is injected from the fuel injector 43 toward each of the intake ports 31F and 31R.

The sub throttle valve 37 is opened by an amount according to a valve opening amount of the main throttle valve 36, which is controlled by the actuator 38 operated by a control computer, not shown. At the same time, a fuel injection amount or rate from the fuel injectors 43 is controlled, and a mixture of the optimum air/fuel ratio based on the operating condition is supplied to the V-type engine 3. Further, reference numeral 45 denotes a link mechanism for idle-up at cold start.

The center air cleaner 26 is arranged in proximity of upper portions of the cylinders 21F and 21R so as to close the upper portion of the V-bank space 30 and shielded, in an outer appearance, in a recessed portion formed in the lower surface of the fuel tank 4. As shown in FIG. 4, a casing of the center air cleaner 26 is divided into right and left two parts in a manner such that a left-side half case 48 and a right-side half case 49 are to be bonded together at the center. The internal space 50 of the casing is communicated to the intake ports 31F and 31R of the cylinders 21F and 21R through the throttle bodies 24F and 24R.

That is, on the lower surface of the casings 48, 49, a recessed portion 51 is formed in the lateral groove state having an inverted V-shape in a vehicle side view, having an inner angle of 90° as shown in FIG. 3. Further, in two front and rear surfaces 52 and 53 constituting this recessed portion 51, the upstream side of the throttle body 24F of the front-side cylinder 21F is directly connected to the rear-side surface 53, while the upstream side of the throttle body 24R of the rear-side cylinder 21R is directly connected to the front-side surface 52.

The fuel injector 43 of each of the throttle bodies 24F and 24R goes into the recessed portion 51. Further, an intake temperature sensor 54 is provided at an upper rear portion of the center air cleaner 26.

Figure 7:
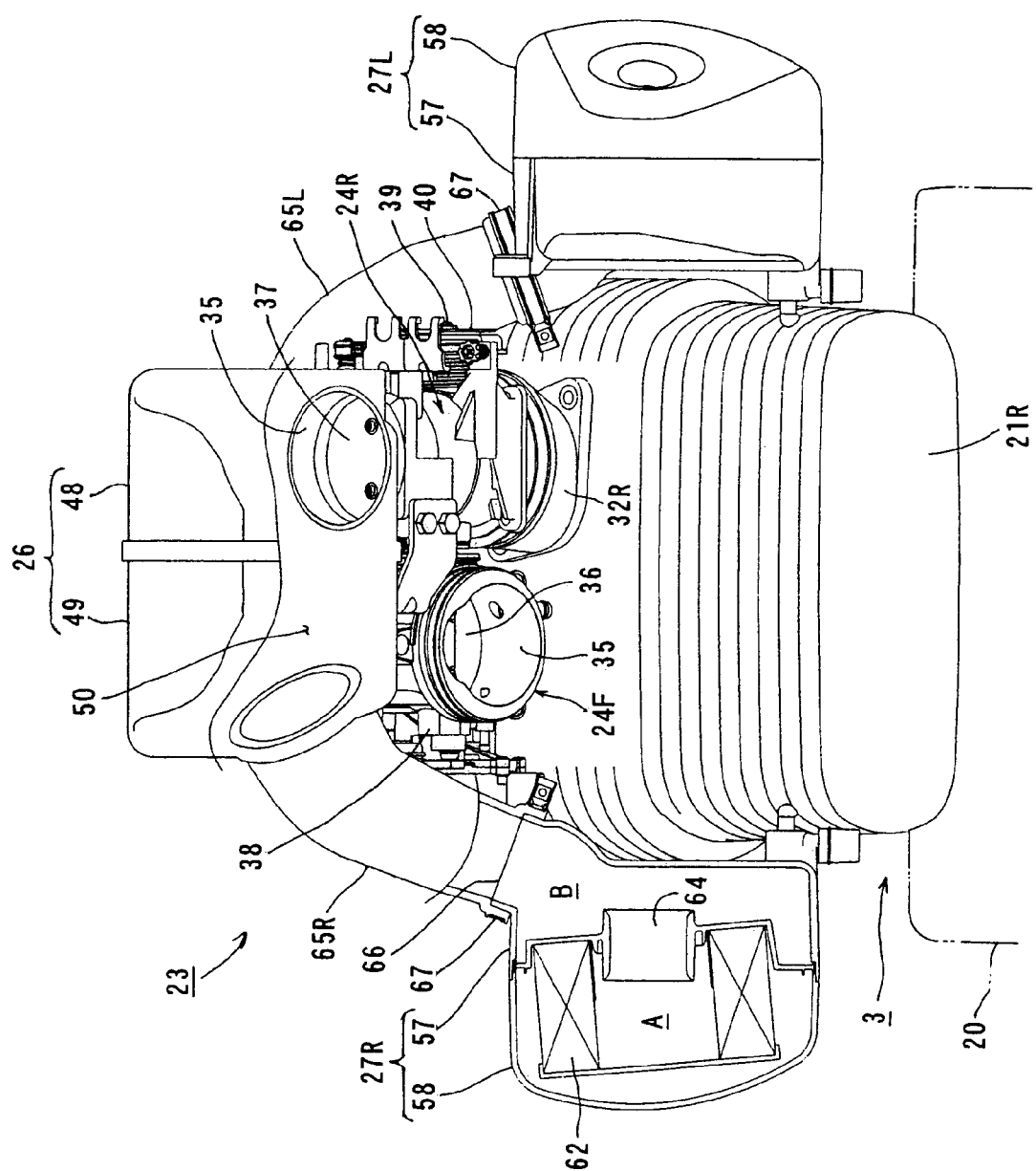
FIG. 7 is a view on arrow VII-VII in FIG. 3.
Figure 8:
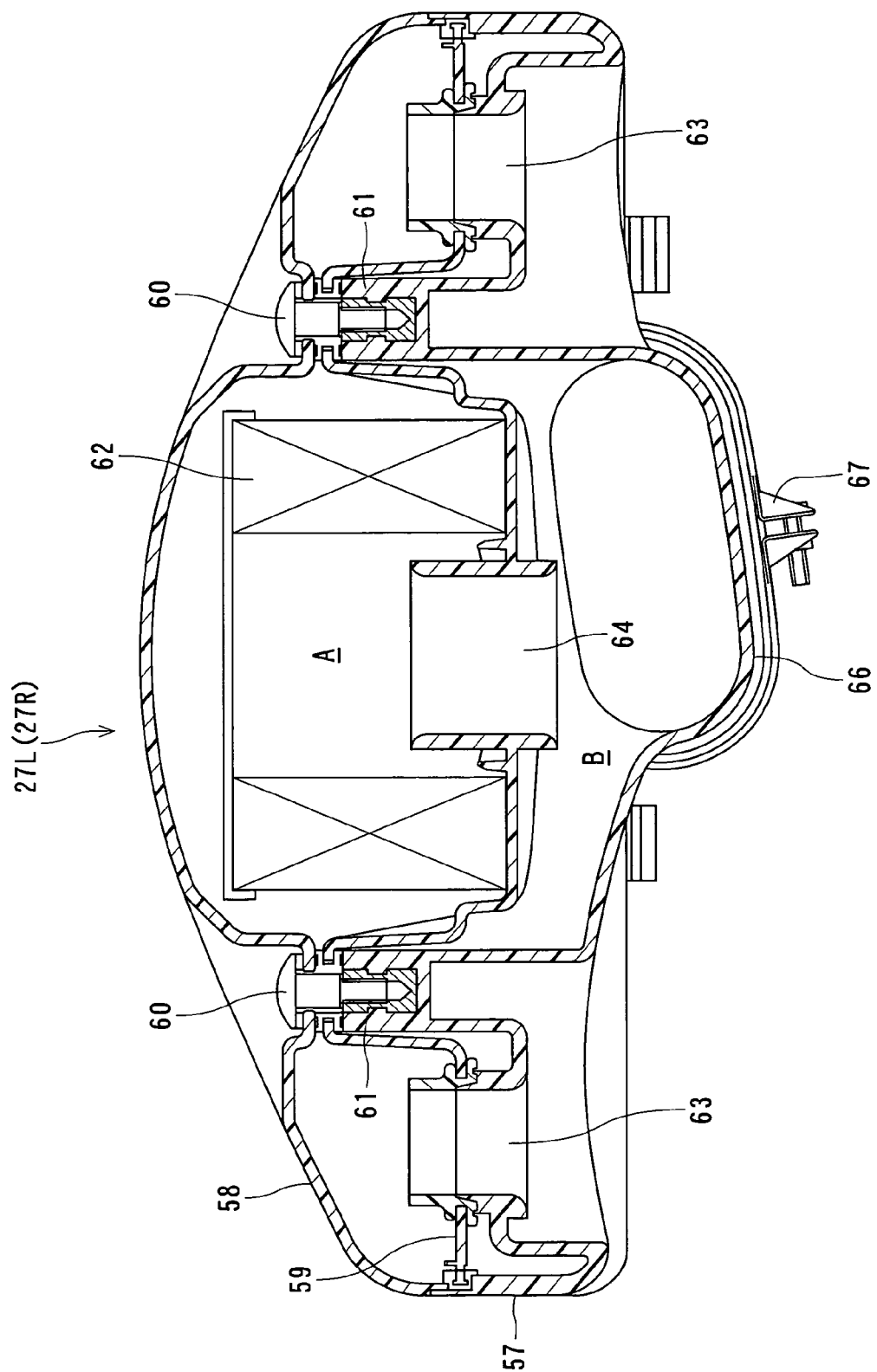
FIG. 8 is a cross-sectional view of a side air cleaner.

In the meantime, the side air cleaners 27L and 27R are, as shown in FIGS. 4, 7 and 8, divided into right and left three parts, in which an inner half case 57, an outer half case 58 and a filter holder 59 are combined together, and the outer half case 58 and the filter holder 59 are fastened to a fastening boss 61 formed on the inner half case 57 with two machine screws 60.

A cylindrical air filter 62 is interposed between the outer half case 58 and the filter holder 59, and the filter 62 is formed to be detachable by removing the outer half case 58. The internal space of the casings 57, 58 is divided into a dirty side "A" and a clean side "B" with the air filter 62 and the filter holder 59 being interposed therebetween.

An intake port 63 communicating with the outside is provided in the dirty side A. This intake port 63 extends inward in the vehicle-width direction of the casing so as to be opened facing on the V-bank space 30 side. Specifically, the two front and rear intake ports 63 are formed in the vicinity of both front and rear ends of the inner half case 57 and opened at positions deeper than the inner surface of the inner half case 57. Each of the intake ports 63 is formed in shape of funnel with less intake resistance. A communication port 64 for communicating the dirty side "A" with the clean side "B" is formed on the filter holder 59.

The clean sides "B" of the side air cleaners 27L and 27R are connected to the center air cleaner 26 through cylindrical intake ducts 65L and 65R, respectively, and the inside of the center air cleaner 26 is also formed as a clean side. The intake ducts 65L and 65R are connected, at lower ends thereof, to an intake union 66 formed at an upper portion inside the side air cleaners 27L and 27R (i.e., inner half case 53) and fixed by means of band 67. Upper ends of the intake ducts 65L and 65R are integrally fixed to and communicated with the side surfaces of the center air cleaner 26.

As shown in FIG. 4, the right and left intake ducts 65L and 65R are connected to right and left side surfaces of the center air cleaner 26 in a manner offset, in connected positions, in the longitudinal direction of the intake device 23. For example, the left-side intake duct 65L extends upward from the rear portion of the side air cleaner 27L and is connected to the rear portion of the left side surface of the center air cleaner 26. On the other hand, the right-side intake duct 65R extends upward from the front portion of the side air cleaner 27R and is connected to the front portion of the right side surface of the center air cleaner 26.

The side air cleaners 27L and 27R have equal capacity and symmetrical shape and are formed so as to have the surface facing outside of the vehicle body, i.e. the outer surface of the outer half case 58, so as to protrude in a mount shape toward outside of the vehicle body.

The shape of the surface of the side air cleaners 27L and 27R (inner half case 57) facing inside of the vehicle body conforms with the shape of the side surface of the cylinder caused by the arrangement of the front and rear cylinders 21F and 21R of the V-type engine 3 off set in the vehicle-width direction.

That is, a notch 70 is formed on the front portion of the inner surface of the inner half case 57 so that at least a part of the side air cleaner 27L (inner half case 57) is located inward in the vehicle-width direction from the left side surface of the cylinder 21F arranged so as to be offset to the left side in the vehicle-width direction as viewed from the left-side side air cleaner 27L, for example, and the inner surface of the side air cleaner 27L is brought close to the left side surface of the cylinder 21R as much as possible.

In the meantime, a similar notch is also formed on the rear portion of the inner surface of the side air cleaner 27R (inner half case 57) on the opposite side, and the inner surface of the side air cleaner 27R is brought close to the left side surface of the cylinder 21F as much as possible.

According to such arrangement mentioned above, the side air cleaners 27L and 27R are brought close to the front and rear cylinders 21F and 21R of the V-type engine 3 as much as possible and the center air cleaner 26 is arranged in proximity of the upper portion of the cylinders 21F and 21R so that the upper portion of the V-bank space 30 is closed or shielded. Therefore, as mentioned above, the inside of the V-bank space 30 is formed so as to provide a closed semi-chamber structure by the three air cleaners 26, 27L and 27R as well as the fuel tank 4 so as not to be directly seen from the outside.

In the intake device 23 constituted as mentioned above, when the V-type engine 3 is operated, an air sucked from the left-side side air cleaner 27L enters the rear portion of the center air cleaner 26 through the intake duct 65L, and most of the entering air is sucked into the throttle body 24F opened rearward inside the center air cleaner 26 and supplied to the front-side cylinder 21F. On the other hand, the air sucked from the right-side side air cleaner 27R enters the front portion of the center air cleaner 26 through the intake duct 65R, and most of the entering air is sucked into the throttle body 24R opened forward inside the center air cleaner 26 and supplied to the rear-side cylinder 21R.

In the intake device 23 of such structure as mentioned above, the center air cleaner 26 is arranged above the V-bank space 30 of the V-type engine 3, and the side air cleaners 27L and 27R are arranged on both right and left sides of the V-bank space 30. Therefore, the total capacity of the three air cleaners 26, 27L and 27R can be ensured to be large in spite of the realization of the compact structure of the entire intake device 23 with the capacity of each of the three air cleaners 26, 27L and 27R being reduced.

The air filter 62 is disposed in the side air cleaners 27L and 27R so as to divide the inside thereof into the dirty side "A" and the clean side "B", and the inside of the center air cleaner 26 is also formed as the clean side. Thus, the clean side capacity is increased so that the intake inertia effect is obtainable and the intake efficiency can be largely improved.

Moreover, the throttle bodies 24F and 24R are placed between the V-bank space 30 and the center air cleaner 26. The throttle body 24R of the rear-side cylinder 21R is directly connected to the front-side surface 52 of the lateral-grooved recessed portion 51 formed on the lower surface of the center air cleaner 26, and on the other hand, the throttle body 24F of the front-side cylinder 21F is connected to the rear-side surface 53. Therefore, the intake passage extending from the throttle bodies 24F and 24R to the intake ports 31F and 31R of the front and rear cylinders 21F and 21R can be formed to be almost straight, and the intake efficiency can be further improved in addition to the above-mentioned intake inertia effect.

Furthermore, the intake ducts 65L and 65R connecting the clean sides "B" of the side air cleaners 27L and 27R to the center air cleaner 26 are connected to the upper portion inside each of the side air cleaners 27L and 27R and the side surface of the center air cleaner 26, and the right and left intake ducts 65L and 65R are connected to the side surfaces of the center air cleaner 26 are arranged in the manner offset in positions in the longitudinal direction of the intake device 23. Therefore, the intake air flowing through the throttle body 24F and the intake air flowing through the throttle body 24R do not interfere with each other in the inside of the center air cleaner 26, thus further improving the intake efficiency with no adverse air interference.

The intake ports 63 of the side air cleaners 27L and 27R are opened facing on the V-bank space 30 side of the V-type engine 3 and opened at the positions deeper than the inner surface of the inner half case 57. Therefore, foreign substances such as dust and moisture can be effectively prevented from being sucked.

Furthermore, the surface of the side air cleaners 27L and 27R facing inside the vehicle body is formed so as to have a shape conforming to the shape of the offset side surface of the front and rear cylinders 21F and 21R of the V-type engine 3. The side air cleaners 27L and 27R are brought close to the side surfaces of the front and rear cylinders 21F and 21R as much as possible by providing the notch 70 on the inner half case 57 of each of the side air cleaners 27L and 27R so that at least a part of the side air cleaners 27L and 27R is located inward in the vehicle-width direction from the cylinder 21R or 21R which is arranged so as to be offset outside in the vehicle-width direction as viewed from the side air cleaner 27L or 27R. Accordingly, the side air cleaners 27L and 27R are prevented from largely extending outward in the vehicle-width direction, the air cleaner capacity is maximally ensured while reducing the dimension of the motorcycle 1 in the vehicle-width direction, which can greatly contribute to the improvement of the intake efficiency.

In the preferred embodiment of the present invention, the intake union 66 and the notch 70 in each of the inner half cases 57 of the right and left side air cleaners 27L and 27R are arranged to be point symmetrical, in positions, as shown in FIG. 4, and the casings (57, 58 and 59) are formed as common portion between the side air cleaners 27L and 27R. Therefore, the number of components of the side air cleaners 27L and 27R can be reduced, thus improving the productivity.

In the meantime, since the throttle bodies 24F and 24R are contained in the recessed portion 51 of the center air cleaner 26, the dimension mainly in the height direction of the intake device 23 can be made compact.

Moreover, the upper portions and both right and left sides of the throttle bodies 24F and 24R are surrounded and covered by the center air cleaner 26 and the side air cleaners 27L and 27R, and the inside of the V-bank space 30 is closed and shielded by the three air cleaners 26, 27L and 27R so that the inside of the V-back space can not be directly seen from the outside of the vehicle body. Therefore, the throttle bodies 24F and 24R can be prevented from fouling, and the intake noise generated by the throttle bodies 24F and 24R and mechanical noise or the like of the V-type engine 3 can be prevented from leaking outside, improving the quietness and hence being advantageous.

In addition, the intake passages 35 of the two units of the throttle bodies 24F and 24R are crossed with each other in the vehicle side view so that the intake passage of the throttle body 24F connected to the front-side cylinder 21F of the V-type engine 3 is raised rearward, while the intake passage of the throttle body 24R connected to the rear-side cylinder 21R is raised forward. Therefore, the area around the throttle bodies 24F and 24R can be made compact, and the length of the intake passage from the center air cleaner 26 to the front and rear cylinders 21F and 21R through the throttle bodies 24F and 24R can be made short, thus improving the intake efficiency.

Furthermore, the throttle bodies 24F and 24R are arranged in parallel in the vehicle-width direction, the valve shafts 39 of the respective throttle bodies are directly connected to each other along the vehicle-width direction, and the throttle bodies 24F and 24R are arranged so that the fuel injector 43 is disposed in the recessed portion 51 on the lower surface of the center air cleaner 26. Therefore, the mounting space for the throttle bodies 24F and 24R can be reduced, thereby greatly contributing to the reduction in size of the intake device 23.

The side air cleaners 27L and 27R are mounted at positions at which a rider can grip the side air cleaners 27L and 27R with the knees of the rider sitting on the seat 5 with his feet rested on the steps 7. In this case, the surface of the side air cleaners 27L and 27R facing outside of the vehicle body with the equal capacity and the symmetrical shape is formed so as to be protrude outward of the vehicle body, and in addition to this matter, the rider can surely grip the side air cleaners 27L and 27R with his knees. Accordingly, the riding stability can be greatly improved.

Particularly, for an American type motorcycle, a rider does not take a forward tilting attitude as with this motorcycle 1, and the position of the fuel tank 4 is generally higher than the seating position of the rider. Thus, the rider can not grip the fuel tank 4 with his knees, and therefore, according to the present invention, the structure capable of, for the rider, gripping the side air cleaners 27L and 27R is extremely effective in improving the riding stability of the rider with the motorcycle.

It is further to be noted that the present invention is not limited to the described embodiments and many other changes and modifications may be made without departing from the scopes of the appended claims.

For example, the air filter 62 having the cylindrical shape may be substituted with one having a panel shape to be capable of being disposed at the abutment position between the inner half case 57 and the outer half case 58. In such structure, although the filtering area may be decreased, a simplified partitioning between the dirty side and the clean side may be provided, which will result in the increasing in the capacity of the internal space.

Furthermore, the structure that the intake port 63 is divided into front and rear two parts on one side may be substituted with the structure of the central one on one side. In this structure, it is preferable to locate inside a baffle plate so as to provide a labyrinthine structure to thereby enlarge the filtering area.

Still furthermore, instead of the point symmetrical structure of the intake union 66, there may employ a structure in which the intake union 66 is slightly offset from the position of the point symmetry and the intake ducts 65 is constructed to have the equal length and the equal sectional area. According to this modification, effects equivalent to those mentioned above will be obtainable.

Still furthermore, instead of the valve-shaft structure in which the valve shaft 39 of the main throttle valve 36 is directly connected in the single straight state, two valve shafts may be arranged coaxially and connected to each other so as to be driven through a synchronizing lever. In addition, instead of the link mechanism 45 for idle-up, a dedicated bypass passage for idle-speed control (ISC) and an ISC valve may be provided in the intake passage.

What is claimed is:

1. An intake device of a V-type engine provided with two cylinders inclining in a longitudinal direction of a motorcycle, comprising:
a center air cleaner arranged above a V-bank space formed between the two cylinders of the V-type engine;
a pair of right and left side air cleaners arranged on both sides of the V-bank space; and
an air/fuel mixture supply device disposed between the center air cleaner and the V-bank space,
wherein an internal space of the center air cleaner is communicated with an intake port of each of the cylinders through the air/fuel mixture supply device, each internal space of the side air cleaners is divided into a dirty side and a clean side with an air filter being interposed therebetween, in which the clean sides are connected to the center air cleaner and the dirty sides are provided with an intake port communicating with an outside, respectively, and each of the clean sides is connected to the center air cleaner through an intake duct in a manner offset in the longitudinal direction of a vehicle body of the motorcycle.

2. The intake device of a V-type engine according to claim 1, wherein the pair of right and left side air cleaners have equal capacity and symmetrical shape, and a surface of each of the side air cleaners facing outside of the vehicle body has a shape protruded toward the outside of the vehicle body.

3. The intake device for a V-type engine according to claim 1, wherein a surface of the pair of right and left side air cleaners facing inside of the vehicle body has a shape conforming with a shape of a cylinder side surface caused by an arrangement offset in a vehicle-width direction of the cylinders and each of the side air cleaners is brought close to the side surface of the cylinder so that at least a part of the side air cleaner is located inward, in the vehicle-width direction, from the side surface of the cylinder arranged in a manner offset outward in the vehicle-width direction as viewed from the side air cleaners, the center air cleaner is arranged in a vicinity of upper portions of the cylinders.

4. The intake device for a V-type engine according to claim 1, wherein the right and left intake ducts are connected to a side surface of the center air cleaner.

5. The intake device for a V-type engine according to claim 1, wherein a lateral-grooved recessed portion having an inverted V-shape in a side view of the vehicle body is formed on a lower surface of the center air cleaner, the air/fuel mixture supply device for supplying the mixture to the rear-side cylinder is connected to a front-side surface of two front and rear surfaces constituting the recessed portion, and the air/fuel mixture supply device for supplying the mixture to the rear-side cylinder is connected to the rear-side surface constituting the recessed portion.

6. The intake device for a V-type engine according to claim 5, wherein an upstream side of the air/fuel mixture supply device is directly connected to the front and rear surfaces constituting the recessed portion on the lower surface of the center air cleaner, and a downstream side of the air/fuel mixture supply device is connected to the intake port of each of the cylinders through an inlet pipe.

7. The intake device for a V-type engine according to claim 6, wherein the air/fuel mixture supply device is formed as a fuel-injection throttle body provided with an intake passage in which a butterfly-type main throttle valve manually manipulated is provided, a sub throttle valve manipulated by an actuator is provided on an upstream side of the main throttle valve, a fuel injector is provided on a downstream side of the main throttle valve, intake passages of the two throttle bodies are crossed with each other in a side view of the vehicle body so that the intake passage of the throttle body connected to the front-side cylinder is raised rearward, and the intake passage of the throttle body connected to the rear-side cylinder is raised forward, main throttle valve shafts of both the throttle bodies are directly connected to each other along a vehicle-width direction, and the throttle bodies are arranged so that the fuel injector is disposed in the recessed portion formed on the lower surface of the center air cleaner.

8. The intake device for a V-type engine according to claim 1, wherein the V-type engine is mounted on a front half part of a cradle-type vehicle-body frame, a fuel tank is mounted on the vehicle-body frame so as to be located above the V-type engine, a seat is arranged on the rear side of the fuel tank, a pair of right and left steps are provided on a lower front portion of the V-type engine, and the side air cleaners are arranged at positions at which a rider sitting on the seat and putting feet on the steps grips the side air cleaners with knees of the rider.

* * * * *